Patented Dec. 18, 1928.

1,696,057

UNITED STATES PATENT OFFICE.

HERBERT WILLIAM ROBINSON, OF BIRMINGHAM, AND DERIC WILLIAM PARKES, OF WEST BROMWICH, ENGLAND.

PROCESS FOR RESOLVING EMULSIONS OF TAR OR TAR OILS.

No Drawing. Application filed September 15, 1927, Serial No. 219,802, and in Great Britain December 24, 1926.

This invention relates to the separation or recovery of water gas tar or tar oils derived from tar from aqueous emulsions or suspensions containing these substances. The term "tar oils" as herein used in the specification and following claims is intended to include water gas tar (which consists almost entirely of oils and contains little or no pitch) and distillates of every kind of tar except those containing large quantities of pitch with which the process hereinafter disclosed will not work with equal satisfaction.

The primary object of the present invention is a process for resolving aqueous emulsions or suspensions containing water gas tars or like tars or oils by bringing such emulsions or suspensions into intimate contact with a solid hydrocarbon body in a finely divided state, in order to agglomerate with the hydrocarbon a large proportion of the phase of the emulsion which contains the tar or oil and to separate out a large proportion of the aqueous phase. Another object of the invention is to effect this resolution by means of a cheap and easily obtainable material and a further object is to blend two or more different emulsions together so as to render them more suitable for treatment in accordance with the invention.

These and other objects are attained according to the present invention by a process which consists broadly in adding a hydrocarbon which is soluble in tar or oil and has a melting point below 100 degrees C. to the emulsion after first rendering the latter faintly acid. It is then found that a large proportion of the phase containing the tar or oil agglomerates with the hydrocarbon to a thick mass, while a large proportion of the aqueous phase separates out from the thick mass. Preferably, the hydrocarbon is added to the emulsion or suspension and dissolved in it by heating and the mixture is then rapidly cooled so as to cause the hydrocarbon to separate out in a finely divided crystalline form. Naphthalene has been found to be a very convenient solid hydrocarbon for use in the process according to the present invention, and may be used in the crude or refined state.

Although it is preferred to add the solid hydrocarbon such as naphthalene to the emulsion or suspension, yet in cases where the emulsion or suspension initially contains a considerable proportion of such hydrocarbon, it is sufficient to heat the mixture until the hydrocarbon is uniformly and completely dissolved and then to cool it rapidly with stirring. This results in precipitation of the solid hydrocarbon and subsequent agglomeration of the oil with separation of the water. The oil may then be recovered by any usual method, for example by allowing the hot oil to cool slowly and then to drain it away from the naphthalene, which will have separated. In practice it is found that no addition of naphthalene to the emulsion is required if the naphthalene already present is in the order of 15% to 20% by weight of the oil in the emulsion.

In the processes according to the present invention no other agent than the hydrocarbon is necessary for breaking the emulsion or for coagulating the emulsifying agent provided that the emulsion is rendered acid.

In order that the invention may be thoroughly understood and readily carried into effect, some examples will now be give of processes conducted in accordance therewith.

In one method 800 parts by weight of a creosote emulsion containing 32 per cent of water may be taken and heated with 100 parts by weight of crude naphthalene until the latter is completely dissolved. The mixture is made faintly acid by the addition of a small quantity of a mineral acid or of a waste product containing a mineral acid. When all the naphthalene has been dissolved, the emulsion may be rapidly cooled with stirring. The naphthalene crystallizes and agglomerates with the oil, and 225 parts by weight of water separate out upon the top of this thick mass. This is equivalent to 87.8 per cent of the total water content of the emulsion.

In another case where the emulsion contains a considerable amount of naphthalene for example about 20% by weight of the oil content, and for example 67 per cent of water, 1600 parts by weight of the emulsion may be taken, rendered slightly acid, and heated until the naphthalene dissolves. As before, upon rapid cooling the oil and naphthalene agglomerate into a thick mass, and 890 parts by weight of water are found to separate out on top, this representing 83 per cent of the total water content of the emulsion.

As stated above it is essential to render the emulsion or suspension slightly acid before treatment. One method of accomplishing this consists, for example, in saturating it with carbon dioxide, sulphur dioxide or flue gases.

Although in the examples given above naphthalene has been mentioned, the invention is not, of course, limited to this. Any hydrocarbon, solid at ordinary temperatures, miscible with tar or oil in all proportions and melting below 100 degrees C., may be used. By way of example, acenaphthene, phenanthrene and paraffin wax would all serve to effect resolution of emulsions containing tar oil, but for one reason or another these substances are not as efficient or desirable as naphthalene.

The improved process is particularly useful for resolving heterogeneous emulsions or suspensions of water in oil such as are met with in tar works and gas works. It may be used to resolve an emulsion or suspension containing water-gas tar or other tars if they are blended with emulsions containing creosote and like oil. In many cases met with in practice, the creosote or tar is of about the same specific gravity as water so that even when the emulsion is broken by other known methods very considerable difficulty is usually experienced in obtaining a good separation. By the novel method according to the present invention the high specific gravity of the semisolid agglomerated mass overcomes these difficulties. Further, where emulsions or suspensions are encountered having very different water contents, these may be rendered more suitable for treatment by blending.

Having thus described our invention what we claim as new, and desire to secure by Letters Patent, is:

1. The method of resolving an emulsion of tar oils which consists in rendering the emulsion faintly acid, adding thereto a quantity, greater than 10 per cent by weight of the oleaginous phase, of a solid hydrocarbon soluble in the oleaginous phase of the emulsion and having a melting point below 100° C., heating the mixture thus formed above the melting point of said hydrocarbon, rapidly cooling said mixture to precipitate said hydrocarbon in a finely divided state, and settling out the water from the resulting stiff agglomerate of said oleaginous phase and said hydrocarbon.

2. The method of resolving an emulsion of tar oils which consists in blending together a plurality of such emulsions containing different proportions of water, rendering said blend of emulsions faintly acid, adding thereto a quantity, greater than 10 per cent by weight of the oleaginous phase of said blend, of a solid hydrocarbon soluble in the oleaginous phase of said blend and having a melting point below 100° C., heating the mixture thus formed above the melting point of said hydrocarbon, rapidly cooling said mixture to precipitate said hydrocarbon in a finely divided state, and settling out the water from the resulting stiff agglomerate of said oleaginous phase and said hydrocarbon.

3. The method of resolving an emulsion of tar oils which consists on rendering the emulsion faintly acid, bringing into intimate contact with it in a finely divided state a quantity of naphthalene greater than 10 per cent by weight of the oleaginous phase of said emulsion, and settling out the water from the resulting stiff agglomerate of said oleaginous phase and said naphthalene.

4. The method of resolving an emulsion of tar oils which consists in rendering the emulsion faintly acid, adding thereto a quantity of naphthalene greater than 10 per cent by weight of the oleaginous phase of said emulsion, heating the mixture thus formed above the melting point of naphthalene, rapidly cooling said mixture to precipitate the naphthalene in a finely divided state, and settling out the water from the resulting stiff agglomerate of the oleaginous phase and said naphthalene.

5. In a process of resolving a faintly acid emulsion of tar oils containing a quantity of naphthalene in solid form greater than 10 per cent by weight of the oleaginous phase of the emulsion, the steps which consist in heating said emulsion above the melting point of said napthalene, rapidly cooling the emulsion to precipitate the naphthalene in a finely divided state, and settling out the water from the resulting stiff agglomerate of said oleaginous phase and said napthalene.

6. In a process of resolving an emulsion of tar oils containing a quantity of napthalene in solid form greater than 10 per cent by weight of the oleaginous phase, the steps which consist in bringing the naphthalene in a finely divided state into intimate contact with the emulsion, and settling out the water from the resulting stiff agglomerate of said oleaginous phase and said naphthalene.

In witness whereof we hereunto subscribed our names this 1st day of September, A. D. 1927.

HERBERT WILLIAM ROBINSON.
DERIC WILLIAM PARKES.